(12) United States Patent
Erb et al.

(10) Patent No.: US 10,381,619 B2
(45) Date of Patent: Aug. 13, 2019

(54) ASSEMBLY AND METHOD FOR CONTAINING CONTAMINANTS WITHIN AN INTERIOR AREA OF A TRACTION BATTERY PACK

(71) Applicant: Ford Global Technologies, LLC, Dearborn, MI (US)

(72) Inventors: Dylan Erb, Allen Park, MI (US); Alexander Bartlett, Wyandotte, MI (US); Jacob Wiles, Plymouth, MI (US); Thomas Matthew Younce, Livonia, MI (US); Bikram Singh, Royal Oak, MI (US); Baocheng Sun, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 15/672,709

(22) Filed: Aug. 9, 2017

(65) Prior Publication Data

US 2019/0051874 A1    Feb. 14, 2019

(51) Int. Cl.
*B60K 1/04* (2019.01)
*H01M 2/10* (2006.01)
*B60L 11/18* (2006.01)

(52) U.S. Cl.
CPC .............. *H01M 2/1083* (2013.01); *B60K 1/04* (2013.01); *B60L 11/1879* (2013.01); *H01M 2220/20* (2013.01)

(58) Field of Classification Search
CPC .................................................. H01M 2/1083
See application file for complete search history.

(56) References Cited

U.S. PATENT DOCUMENTS

2015/0280182 A1* 10/2015 Gibeau .................. H01M 2/34
                                                                    429/97
2018/0083243 A1*  3/2018 Brausse ............. H01M 2/1083

FOREIGN PATENT DOCUMENTS

JP          09296815       11/1997
JP        2011239600       11/2011

* cited by examiner

*Primary Examiner* — Ladan Mohaddes
(74) *Attorney, Agent, or Firm* — Carlson, Gaskey & Olds, P.C.

(57) ABSTRACT

An exemplary traction battery assembly includes, among other things, a container disposed about a portion of a fastened joint within an interior of a traction battery enclosure. The container is configured to hold contaminants to block the contaminants from contacting a surface of a component housed within the interior. An exemplary contaminant containing method includes, among other things, within an interior area of a traction battery enclosure, holding contaminants within a container to block the contaminants from contacting a surface of a component housed within the interior. The container is disposed about a fastened joint within the interior area.

20 Claims, 3 Drawing Sheets

ASSEMBLY AND METHOD FOR CONTAINING CONTAMINANTS WITHIN AN INTERIOR AREA OF A TRACTION BATTERY PACK

TECHNICAL FIELD

This disclosure relates generally to containing contaminants released within a battery pack enclosure and, more particularly, to containing contaminants resulting from securing a fastened joint.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack is used to selectively power the electric machines and other electrical loads of the electrified vehicle. The battery pack can include an enclosure that houses multiple interconnected battery cells and other components. The battery cells store energy for powering the electrical loads. Various components of the battery pack can be exposed to contaminants, such as shavings generated when torqueing down threaded fasteners.

SUMMARY

A traction battery assembly according to an exemplary aspect of the present disclosure includes, among other things, a container disposed about a portion of a fastened joint within an interior of a traction battery enclosure. The container is configured to hold contaminants and to block the contaminants from contacting a surface of a component housed within the interior.

In a further non-limiting embodiment of the foregoing assembly, the contaminants are shavings from a fastener of the fastened joint.

In a further non-limiting embodiment of any of the foregoing assemblies, the fastener is a first fastener that threadably engages a second fastener to provide the fastened joint.

In a further non-limiting embodiment of any of the foregoing assemblies, the first fastener is a bolt and the second fastener is a weld nut.

In a further non-limiting embodiment of any of the foregoing assemblies, the second fastener includes an aperture that receives the first fastener when the first and second fastener are engaged with each other to provide the fastened joint.

In a further non-limiting embodiment of any of the foregoing assemblies, the container is distributed circumferentially continuously about the aperture.

In a further non-limiting embodiment of any of the foregoing assemblies, the container is snap-fit to the fastened joint.

In a further non-limiting embodiment of any of the foregoing assemblies, the container is interference-fit to the fastened joint.

A further non-limiting embodiment of any of the foregoing assemblies includes a first and second portion of the traction battery enclosure. The first portion is held relative to the second portion by the fastened joint.

In a further non-limiting embodiment of any of the foregoing assemblies, the first portion is a lid of the traction battery enclosure and the second portion is a tray of the traction battery enclosure.

A further non-limiting embodiment of any of the foregoing assemblies includes a battery array held with the interior area. The fastened joint secures the battery array to the traction battery enclosure.

In a further non-limiting embodiment of any of the foregoing assemblies, the container is made of a polymer-based material.

A contaminant containing method according to another exemplary aspect of the present disclosure includes, among other things, within an interior area of a traction battery enclosure, holding contaminants within a container to block the contaminants from contacting a surface of a component housed within the interior. The container is disposed about a fastened joint within the interior area.

In a further non-limiting embodiment of the foregoing method, the contaminants are shavings from a fastener of the fastened joint.

A further non-limiting embodiment of any of the foregoing methods includes generating the contaminants when securing a first fastener of the fastened joint to a second fastener of the fastened joint.

In a further non-limiting embodiment of any of the foregoing methods, the first fastener threadably engages the second fastener to provide the fastened joint.

In a further non-limiting embodiment of any of the foregoing methods, the second fastener includes an aperture that receives the first fastener when the first and second fastener are engaged with each other to provide the fastened joint.

In a further non-limiting embodiment of any of the foregoing methods, the container is distributed circumferentially continuously about the aperture.

A further non-limiting embodiment of any of the foregoing methods includes snap-fitting the container to the fastened joint.

A further non-limiting embodiment of any of the foregoing methods includes holding the container relative to the fastened joint via an interference fit.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to containing contaminants released within an interior area of a traction battery pack enclosure. Containing the contaminants can prevent the contaminants from moving around the interior area and containing an undesirable area, such as a high-voltage area requiring isolation. In particular, the disclosure relates to a container that contains contaminants associated with a fastened joint of the traction battery pack. The contaminants can be, for example, shavings generated when securing the fastened joint of the traction battery pack.

Figure 1:
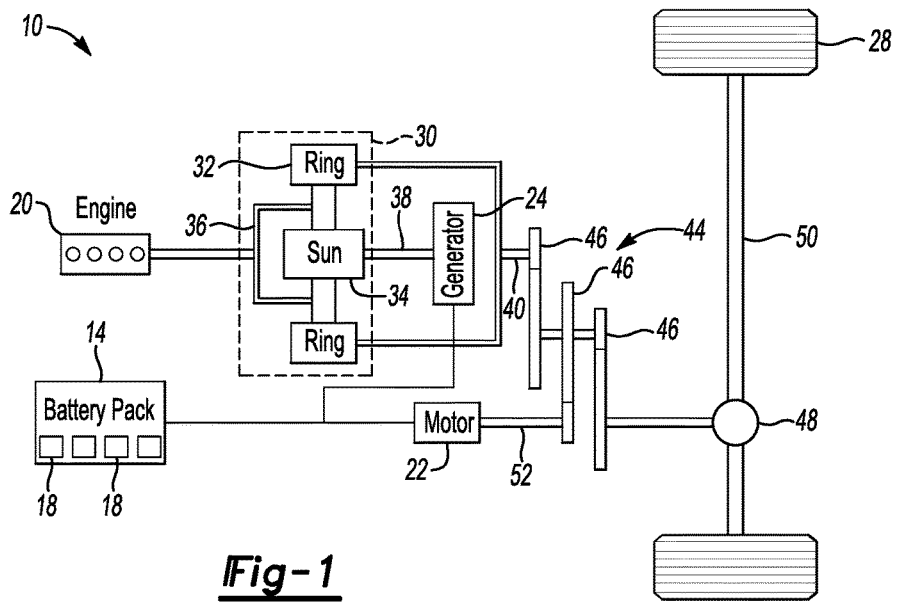
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 16 held within an enclosure 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10. Since the battery pack 14 provides selectively powers propulsion, the battery pack 14 is a traction battery pack.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
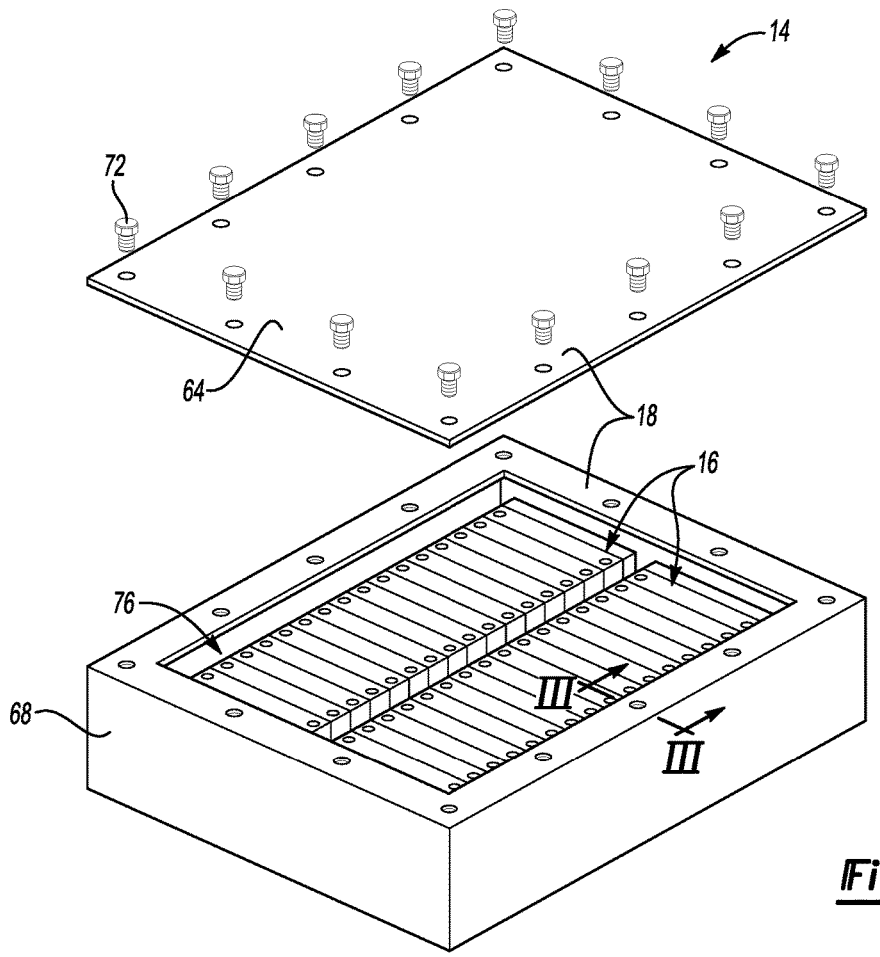
FIG. 2 illustrates a battery pack from the powertrain of FIG. 1 with a lid of an enclosure removed to reveal battery arrays within an interior area of the enclosure.

Referring now to FIG. 2 with continuing reference to FIG. 1, the enclosure 18 of the battery pack generally includes a lid 64 secured to a tray 68 with a plurality of fasteners 72. The battery arrays 16 are held within an interior area 76 provided between the tray 68 and the lid 64.

In an exemplary non-limiting embodiment, both the lid 64 and the tray 68 of the enclosure 18 are a metal or a metal-alloy, such as a sheet metal. In other examples, the lid 64 is a metal or a metal-alloy, and the tray 68 is a polymer-based material, such as a sheet molding compound (SMC). In other examples, the tray 68 is a metal or metal-alloy, and the tray 68 is a polymer-based material.

Figure 3:
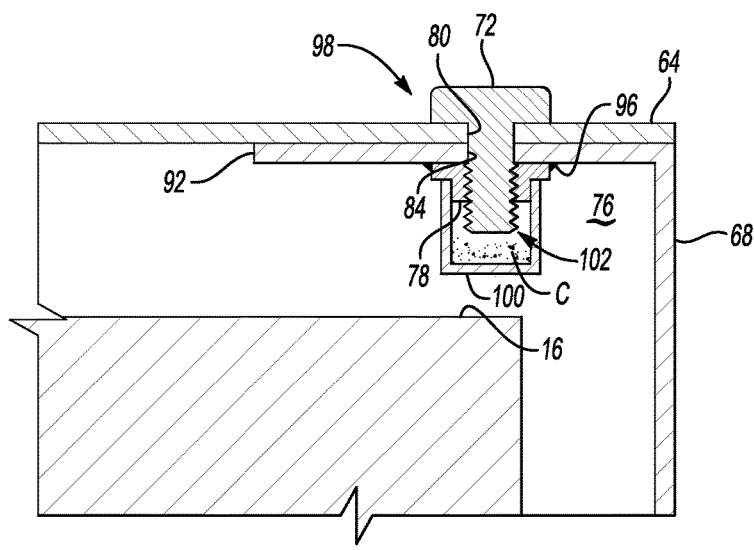
FIG. 3 illustrates a section view taken along Line in FIG. 2 revealing a container disposed about a portion of a fastened joint of the battery pack according to an exemplary embodiment of the present disclosure.
Figure 4:
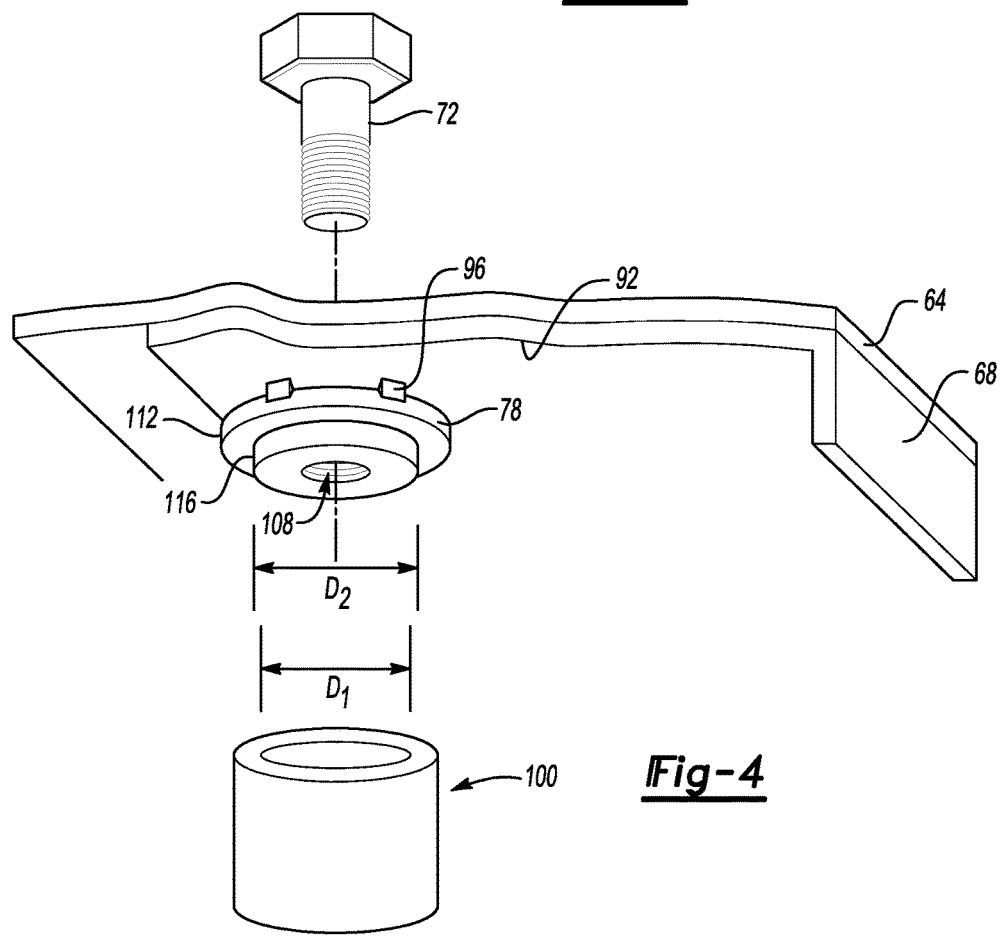
FIG. 4 illustrates a perspective and expanded view of the fastened joint and container of FIG. 3.

Referring now to FIGS. 3 and 4 with continuing reference to FIG. 2, the fasteners 72 are first fasteners 72 that engage respective second fasteners 78 when securing the lid 64 to the tray 68. In this example, the first fasteners 72 are bolts and the second fasteners 78 are weld nuts. In another exemplary embodiment, the first fastener is a nut and the second fastener is a threaded stud. In yet another exemplary embodiment, the first fastener and the second fastener are another type of mechanical fastener, such as different portions of a rivet When securing the lid 64 to the tray 68, each of the first fasteners 72 extends through an aperture 80 in the lid 64 and an aperture 84 in the tray 68 to engage a respective one of the second fasteners 78. In this example, the aperture 84 in the tray 68 is provided within a flange 92 that extends across the interior area 76 and over a portion of the battery arrays 16. The second fasteners 78 are welded directly to an underside of the flange 92 with welds 96

To secure the lid 64 to the tray 68, the first fastener 72 is torqued and rotated into the second fastener 78. The welds 96 prevent the second fastener 78 from spinning relative to the first fastener 72 during the securing. When the first fastener 72 is fully seated within the second fastener 78, the first fastener 72 and the second fastener 78 provide a fastened joint 98. The lid 64 is a portion of the enclosure 18 that is held relative to the tray 68 by the fastened joint 98.

The movement of the first fastener 72 into the second fastener 78 can generate contaminants C, such as shavings from the first fastener 72, the second fastener 78, or both. The contaminants C could instead, or additionally, include shavings of the lid 64, the tray 68, or both.

The contaminants C, in some examples, could include flakes shed from a coating on the first fastener 72, or removed from another area of the fastened joint 98. The coating could be for corrosion protection.

If not blocked, the contaminants C could move to a position near one of the battery arrays 16, or some other component within the interior area 76 of the enclosure 18. Movement of the contaminants C into these areas could undesirably compromise high-voltage isolation, particularly if the contaminants C are electrically conductive. In an exemplary embodiment, shavings from the first fastener 72 would be electrically conductive since the first fastener 72 is a metal or metal alloy.

To prevent movement of the contaminants C into these areas, a container 100 is disposed about a portion of the fastened joint 98. The container 100 holds the contaminants C, which blocks the contaminants C from contacting a surface of the battery arrays 16, or a surface of any other component within the interior area 76 other than those components associated directly with the fastened joint 98.

The container 100, in this example, is secured to the second fastener 78 prior to torqueing the first fastener 72 together with the second fastener 78. The second fastener 78 includes an aperture 108, a collar portion 112, and an extension portion 116. The container 100 receives the extension portion 116 to secure the container to the second fastener 78.

The aperture 108 threadably receives the first fastener 72 when providing the fastened joint 98. The extension portion 116 extends from the collar portion 112 relative to an axis of the aperture 108.

A diameter of the collar portion 112 is larger than a diameter of the extension portion 116. In this example, the container 100 is configured to be press-fit over the extension portion 116 to secure the container 100. In particular, prior to being fit over the extension portion 116, the container 100 has a diameter $D_1$ that is undersized relative to a diameter $D_2$ of the extension portion 116 of the second fastener 78. Moving the container 100 over the extension portion 116 increases the diameter $D_1$ to at least the diameter $D_2$. The container 100 then stays positioned over the extension portion 116, as shown in FIG. 3, via an interference fit.

The container 100 is distributed circumferentially continuously about extension portion 116 and the aperture 108 such that there is no path for contaminants C to move from the aperture 108 to the interior area 76.

After the container 100 is secured to the extension portion 116, the first fastener 72 can be torqued down to provide the fastened joint 98. The container 100 is axially long enough to permit the first fastener 72 to fully run down during the securing. The contaminants C resulting from the securing of the first fastener 72 fall into an open area 102 of the container 100. The contaminants are then contained within the open area 102 to prevent the contaminants from moving into an undesirable region of the interior area 76.

In this example, the container 100 is a polymer-based material, such as a nylon. The container 100 could be other materials in other examples, such as a metal or a metal alloy material.

Figure 5:
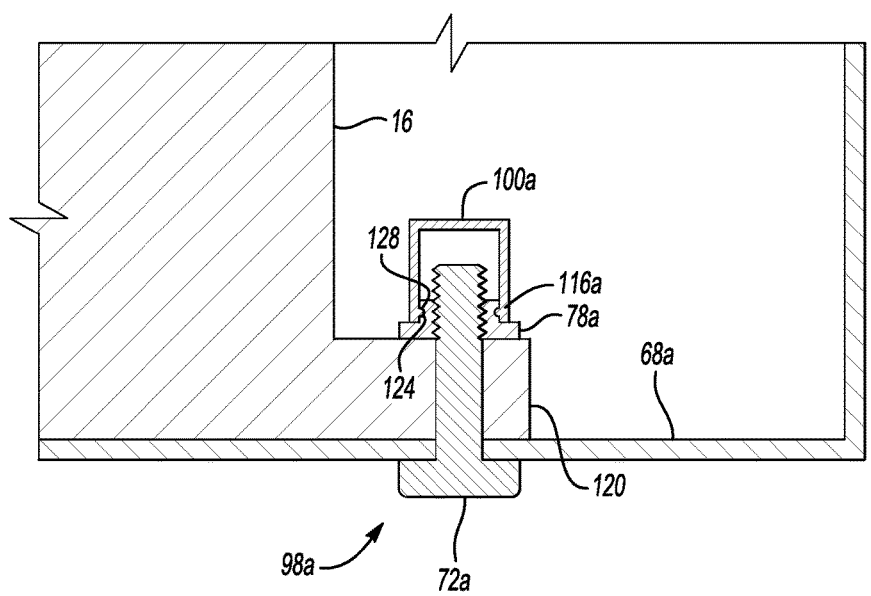
FIG. 5 illustrates a container disposed about a portion of a fastened joint according to another exemplary embodiment of the present disclosure.

Referring now to FIG. 5, in another exemplary embodiment, a container 100a is used in connection with a first fastener 72a that engages a second fastener 78a to provide a fastened joint 98a. The second fastener 78a is secured to one of the battery arrays 16. The fastened joint 98a secures one of the battery arrays 16 to a floor of the tray 68.

When secured, the first fastener 72a extends through an aperture in the floor of the tray 68 and through an aperture in a foot 120 the battery array 16a. In this example, the first fastener 72a is a bolt that threadably engages the second fastener 78a to secure the battery array 16a within the interior area 76 of the enclosure 18, and the second fastener 78a is a weld nut.

A container 100a is placed over the fastened joint 98a to contain contaminants generated when securing the first fastener 72a to the second fastener 78a. In this example, the second fastener 78a includes a groove 124 extending circumferentially continuously about an extension portion 116a of the second fastener 78a.

The container 100a includes a corresponding rib 128 that is received within the groove 124 as the container 100a is moved axially toward the extension portion 116a. The rib 128 flexes radially outward as the container 100a is moved axially over the extension portion 116a toward the groove 124. At the groove 124, the rib 128 snaps radially inward to fit within the groove 124 and hold the container 100a relative to the second fastener 78a. The container 100a is thus considered snap-fit to the second fastener 78a.

Notably, the container 100a of FIG. 5 could be interference-fit rather than snap-fit. Further, the container 100 of FIG. 3 could be snap-fit rather than interference-fit. In still other examples, the container 100 of FIG. 3 could be adhesively secured to the second fastener 78, or the container 100 of FIG. 5 could be adhesively secured to the second fastener 78a.

Features of the disclosed examples include containing contaminants within an interior area of a high voltage battery. This can prevent the shavings or contaminants from moving to a position within the interior area where the contaminants could compromise high voltage isolation.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising
a container disposed about a portion of a fastened joint within an interior of a traction battery enclosure, the container configured to hold contaminants and to block the contaminants from contacting a surface of a component housed within the interior.

2. The traction battery assembly of claim 1, wherein the contaminants are shavings from a fastener of the fastened.

3. The traction battery assembly of claim 1, wherein the fastener is a first fastener that threadably engages a second fastener to provide the fastened joint.

4. The traction battery assembly of claim 3, wherein the first fastener is a bolt and the second fastener is a weld nut.

5. The traction battery assembly of claim 3, wherein the second fastener includes an aperture that receives the first fastener when the first and second fastener are engaged with each other to provide the fastened joint.

6. The traction battery assembly of claim 5, wherein the container is distributed circumferentially continuously about the aperture.

7. The traction battery assembly of claim 1, wherein the container is snap-fit to the fastened joint.

8. The traction battery assembly of claim 1, wherein the container is interference-fit to the fastened joint.

9. The traction battery assembly of claim 1, further comprising a first and second portion of the traction battery enclosure, the first portion held relative to the second portion by the fastened joint.

10. The traction battery assembly of claim 9, wherein the first portion is a lid of the traction battery enclosure and the second portion is a tray of the traction battery enclosure.

11. The traction battery assembly of claim 1, further comprising a battery array held with the interior area, the fastened joint securing the battery array to the traction battery enclosure.

12. The traction battery assembly of claim 1, wherein the container is made of a polymer-based material.

13. A contaminant containing method, comprising:
within an interior area of a traction battery enclosure, holding contaminants within a container to block the contaminants from contacting a surface of a component housed within the interior, the container disposed about a fastened joint within the interior area.

14. The contaminant containing method of claim 13, wherein the contaminants are shavings from a fastener of the fastened.

15. The contaminant containing method of claim 13, generating the contaminants when securing a first fastener of the fastened joint to a second fastener of the fastened joint.

16. The contaminant containing method of claim 15, wherein the first fastener threadably engages the second fastener to provide the fastened joint.

17. The contaminant containing method of claim 15, wherein the second fastener includes an aperture that receives the first fastener when the first and second fastener are engaged with each other to provide the fastened joint.

18. The contaminant containing method of claim 17, wherein the container is distributed circumferentially continuously about the aperture.

19. The contaminant containing method of claim 15, further comprising snap-fitting the container to the fastened joint.

20. The contaminant containing method of claim 15, further comprising holding the container relative to the fastened joint via an interference fit.

\* \* \* \* \*

UNITED STATES PATENT AND TRADEMARK OFFICE
CERTIFICATE OF CORRECTION

PATENT NO. : 10,381,619 B2  
APPLICATION NO. : 15/672709  
DATED : August 13, 2019  
INVENTOR(S) : Dylan Erb et al.

Page 1 of 1

It is certified that error appears in the above-identified patent and that said Letters Patent is hereby corrected as shown below:

In the Claims

In Claim 2, Column 6, Line 29; replace "fastener of the fastened." with --fastener of the fastened joint.--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*